INVENTOR.
JAMES R. LUCK
FRANK S. MILLS
BY
ATTORNEY

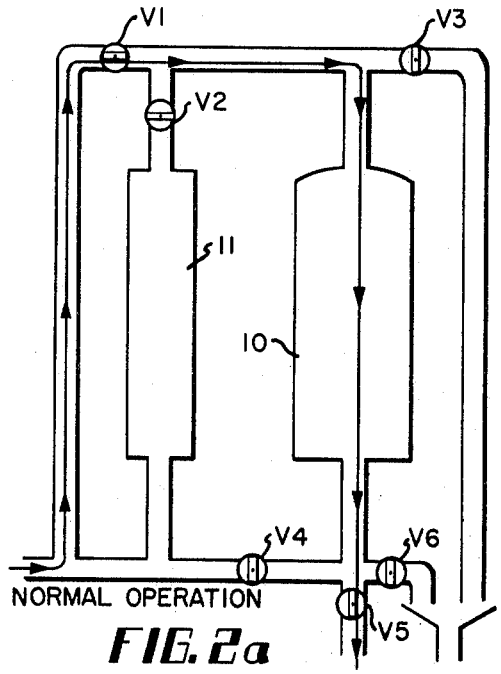
FIG. 2a NORMAL OPERATION
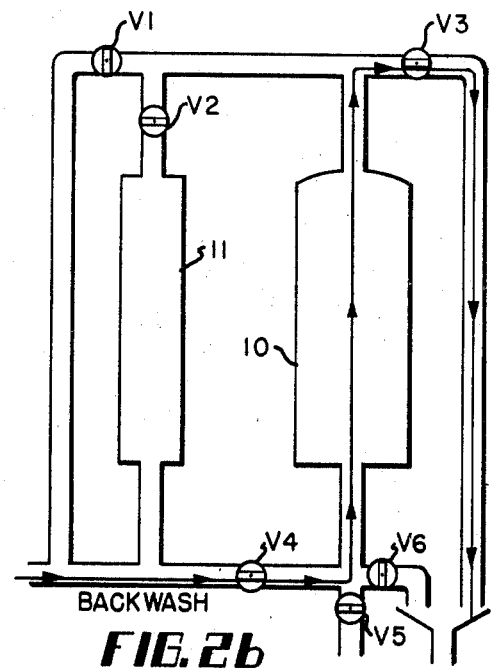
FIG. 2b BACKWASH
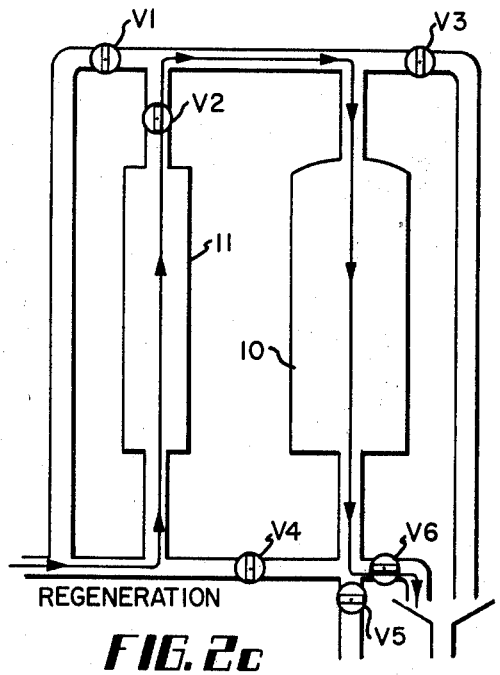
FIG. 2c REGENERATION
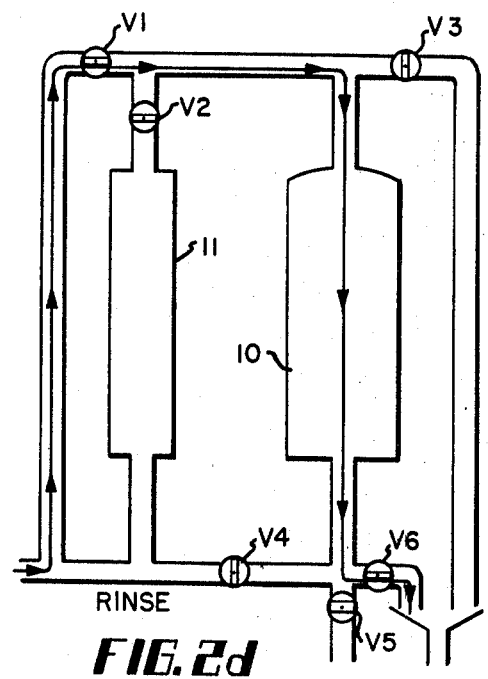
FIG. 2d RINSE
INVENTOR.
JAMES R. LUCK
FRANK S. MILLS
ATTORNEY

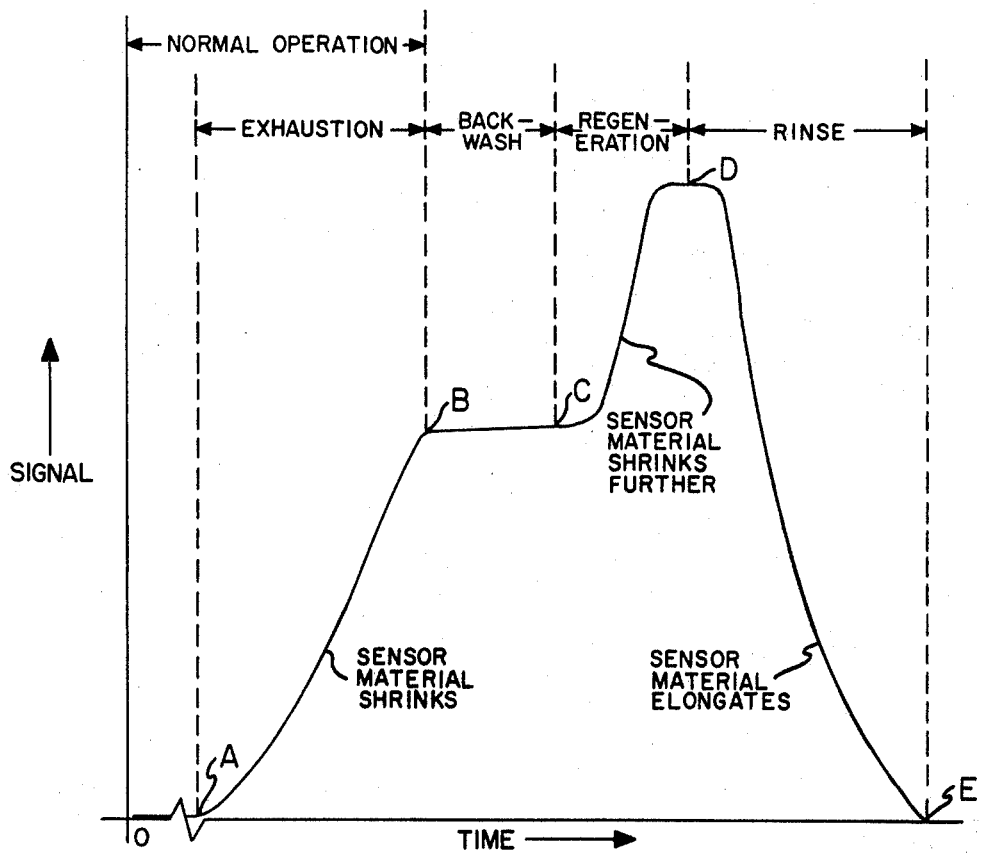

INVENTOR.
JAMES R. LUCK
FRANK S. MILLS

United States Patent Office 3,477,576
Patented Nov. 11, 1969

3,477,576
WATER SOFTENER CONTROL
James R. Luck and Frank S. Mills, Minneapolis, Minn., assignors to Honeywell Inc., Minneapolis, Minn., a corporation of Delaware
Filed Oct. 3, 1966, Ser. No. 583,585
Int. Cl. C02b 1/16
U.S. Cl. 210—96                                    9 Claims

---

ABSTRACT OF THE DISCLOSURE

A water hardness sensor is disclosed wherein the sensing element is a material which shrinks to one dimension when exposed to hard water and to a smaller second dimension when exposed to brine. A differential transformer arrangement is combined with the sensing element to provide an electrical control signal. A circuit is disclosed in combination with the sensor by means of which positive control over all the operating phases of a water softener is achieved.

---

This invention is particularly concerned with an improved water softener control system and an improved control device for use with the control system. The invention is an improvement over that disclosed in U.S. Patent 3,250,392.

In general, the aforementioned patent discloses a membrane type of control device composed of a sheet or length of ion exchange material which changes in dimension when exposed to hard water due to the depletion of "soft ions" contained in the material. Upon shrinking, due to the depletion of the "softening characteristic" in the ion exchange material, a switch is operated to initiate the regeneration phase of a water softener.

This invention improves the aforementioned arrangement in several ways. The ion exchange membrane is incorporated into a structure which is constructed and arranged to not only initiate the regeneration of a water softener but to maintain positive control over various operating phases thereof since the improved sensor is capable of providing a continuous electrical output, the magnitude of which is dependent on the condition of the contents of the softener tank. The improved sensor not only takes advantage of the shrinking which occurs when the material proceeds from the "soft form" to the "hard form" but it also takes advantage of the further shrinkage which occurs in the "hard form" when the membrane is dehydrated by the brine used to regenerate the softener apparatus. Additionally, the device controls the rinse phase by taking advantage of the fact that the material reverts to its original size when exposed to soft water. The improved device is thus capable of providing both an output to initiate regeneration, an output to end regeneration and initiate the rinse phase and an output to end rinsing and return the water softener to normal service. Positive control of the apparatus is thus provided.

The preferred embodiment of the control device is designed to transmit its electrical signal through the water tight barrier formed by the softener tank or pipes associated therewith and into which the sensor may be inserted without physically piercing the barrier.

Referring to the drawings:

FIGURE 1 is a schematic representation of a water softener.

FIGURES 2a, 2b, 2c and 2d sequentially show four phases of operation of the water softener of FIGURE 1.

FIGURE 3 is a diagram showing the operational sequence of the valves used in the water softener of FIGURE 2.

FIGURE 5 is a diagram illustrating the output of the control device during various operating phases of the water softener of FIGURE 1.

WATER SOFTENER

Figure 1:
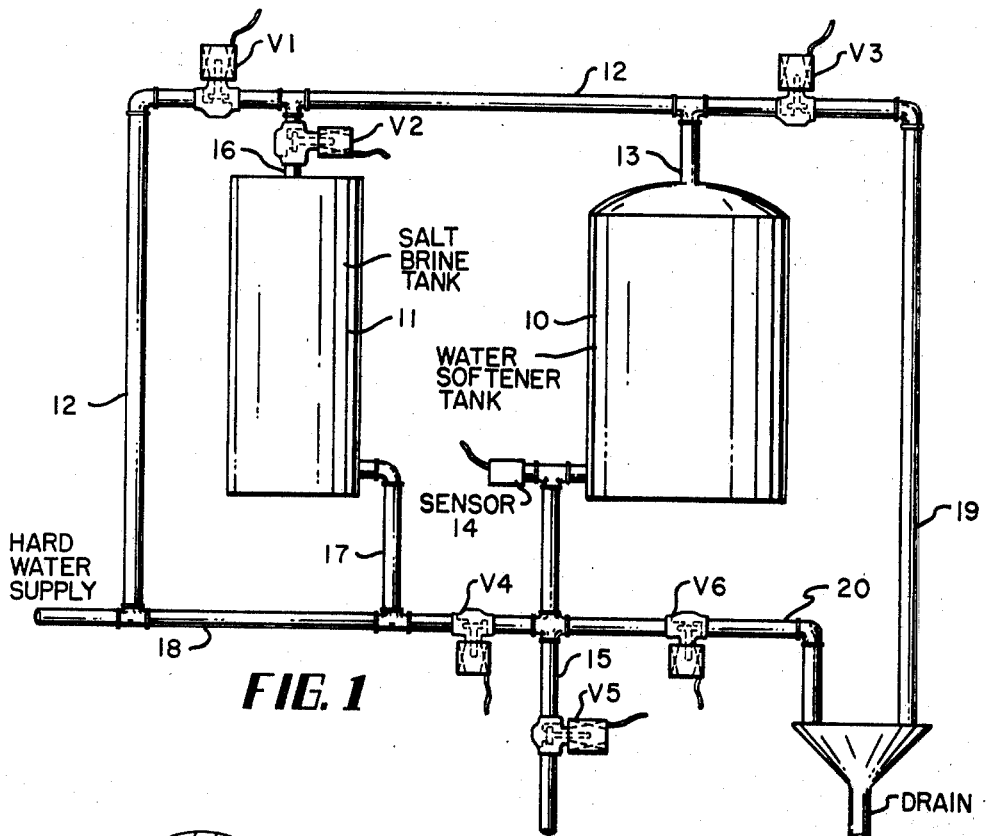

Referring to FIGURE 1, a water softener has a softener tank 10 containing ion exchange material such as zeolite pellets and a salt brine tank 11 containing salt. Salt water is obtained for regenerating the ion exchange material in tank 10 when water flows through tank 11. The tanks are interconnected by a series of pipes. During normal operation, hard water is supplied to tank 10 by hard water supply pipe 12 and softener input pipe 13 to flow through the tank for softening, through sensor 14 and finally through output pipe 15 to provide soft water. Also included in the apparatus is a brine tank output pipe 16, a brine tank input pipe 17, a hard water bypass pipe 18 and drain pipes 19 and 20. Located in these pipes are several electrically operated valves: valve V1 in pipe 12, positioned between the hard water supply and pipe 16; valve V2 positioned in pipe 16; valve V3 in pipe 12, positioned between pipe 13 and pipe 19; valve V4 in pipe 18, positioned between pipe 17 and pipe 15; valve V5 in pipe 15, and valve V6 in pipe 20. Valves V1 and P5 are of the type that are normally open without electrical power. The remainder of the valves are normally closed without electrical power. Therefore, in the case of power failure, it is possible to draw water from the system.

Reference is now made to FIGURE 2 to discuss the overall operation of the apparatus during various operating phases. The valves determine which operating phase the softener apparatus is in since each phase is characterized by certain valves being open and certain others being closed. FIGURE 2a is indicative of the normal operating phase of the softener. The arrows indicate the direction of water flow through the softener during this phase. The valves are shown in their respective open and closed positions. At the point of exhaustion, when the ion exchange material in tank 10 is no longer capable of softening water, sensor 14 initiates the backwash phase during which time the valves are placed in the condition shown in FIGURE 2b. The water flow through the system is then modified as indicated. The backwash phase is a timed phase which may last for 5 to 10 minutes. After completion of the timed backwash phase, brine is drawn into tank 10 as shown by the flow illustrated in FIGURE 2c. During this phase, referred to as the regeneration phase, the valves are placed in the condition shown in FIGURE 2c. At the end of the regeneration phase, when the brine has dehydrated the membrane in sensor 14 causing it to shrink to its minimum length, sensor 14 initiates the rinsing phase to remove salts formed during the regeneration phase which remain in the tank. During the rinse phase the valves are placed in the condition shown in FIGURE 2d to establish the desired flow through the apparatus as illustrated in the figure. Due to the elongation of the sensor material upon exposure to rinse water, the sensor signals the end of the rinse phase. The operational sequence for opening the valves during the operating phases of the apparatus is shown in the diagram of FIGURE 3.

CONTROL DEVICE

Figure 4A:
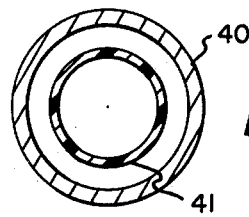
FIGURE 4a is a cross sectional view of a portion of FIGURE 4.
Figure 4:
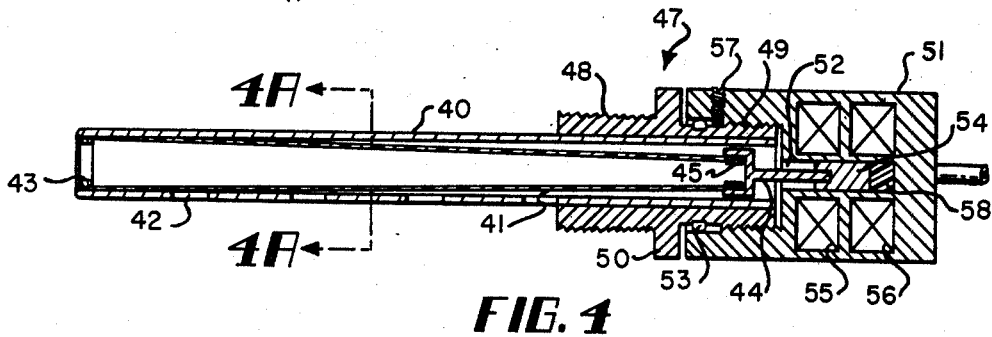
FIGURE 4 is a cross sectional view of a control device constructed according to this invention.

Referring to FIGURES 4 and 4a, the device per se includes a support tube 40 surrounding sensor material 41. Support tube 40 is formed with a plurality of openings 42 therein to expose material 41 to water. Material 41 is held in place at one end by means of a retainer clip 43 which secures it to an end of support tube 40. The other end of material 41 is attached to stirrup 44 by retainer clip 45. Stirrup 44 is made of a non-magnetic material. Support tube 40 is carried by mounting member 47 which is comprised of two oppositely extending, externally threaded, hollow cylinders 48 and 49 separated by a radial flange or collar 50. Collar 50 serves as an abutment member when the device is mounted in a pipe or the like as shown in FIGURE 1. Housing 51 is carried by mounting member 47 by a threaded connection as shown in the figure and forms a watertight, hollow chamber 52 with the aid of O-ring 53. Chamber 52 carries a movably mounted, magnetically permeable core member or plunger 54. Plunger 54 is connected to stirrup 44 and is movably responsive to dimensional changes of material 41 so as to be variably positioned depending on the condition of the material. Coils 55 and 56 are incorporated into the walls of housing 51 surrounding movable plunger 54.

A control device including a transformer arrangement is thus provided in which dimensional changes in material 41 cause plunger 54 to move in the gap of the transformer formed by coils 55 and 56. These changes in transformer coupling are sensed and utilized by electrical means described hereinbelow. Although the sensing material 41 is necessarily submerged in water, this arrangement provides the means by which dimensional changes in the membrane may be transmitted through a watertight barrier by means of the magnetic coupling between the coils 55 and 56 and plunger 54, thus completely avoiding leakage problems which have existed in the past due to the necessity of physical connection between material 41 and the responsive means connected to it.

In this preferred embodiment sensor material 41 takes the form of a sheet of ion exchange material rolled into a cylinder or tube. Certain advantages are obtained when it is used in the cylindrical form. For example, the tube has greater strength than a simple length of material and is capable of pushing as well as pulling plunger 54 without the aid of springs or the like whereas a sheet or length of material would tend to buckle when required to push plunger 54.

In a preferred embodiment of the invention, a differential transformer arrangement is desirable, in which case the position of plunger 54 may be mechanically adjusted in the transformer gap by turning housing 51 on or off of threaded cylinder 49 to provide a null or zero output from the differential transformer when the sensor material is at its maximum length in the soft form. When the desired null position of plunger 54 within the gap is obtained, it may be fixed by means of set screw 57. Over-travel of plunger 54 is prevented by a plastic insert 58.

The device may be incorporated into a water softener in various ways. It may be inserted in the output pipe of the softener tank as shown in FIGURE 1 by means of threaded cylinder 48 where it is exposed to all the conditions in the softener bed by exposure to the effluent. Also, it may be inserted through an opening in the softener tank (not shown) some distance above the bottom of the softening bed depending upon the amount of anticipation desired in the water softener control system.

FIGURE 5 is helpful in illustrating the output control signal produced by the device during the various operating phases. As previously stated, the device is preferably arranged to provide a null output or first output during normal operation when material 41 is at its maximum length. Hence the device does not provide a positive output until the exchange material in the softener tank begins to reach a state of exhaustion. At this time, indicated as A in FIGURE 5, the hardness of the effluent from the softener tank begins to increase and sensor material 41 shrinks in size to provide a second output. This dimensional change moves plunger 54 from the null position causing the transformer coils to generate a signal which increases to a second value indicated at B. The signal level may be adjusted to represent any desirable water hardness by proper adjustment of the device, by utilizing different ion exchange materials for membrane 41 or by changes in the electrical circuit used with it. During the backwash phase, indicated between B and C, only a slight change, if any, will take place in the dimensions of material 41 and the output signal. Thus, this phase of operation must be timed. A preferred timing means is discussed hereinbelow. During the regeneration phase, indicated between C and D, material 41 decreases still further in size as the concentrated brine dehydrates it due to excess salt ions. At point D the size of the material is at its minimum and a third output is produced which in this embodiment provides a third value of the signal which is at its maximum. During the rinse phase indicated between D and E, rehydration of the membrane occurs as fresh water washes out the excess salt and the maximum material size is again established at point E. The softener is then ready to re-enter normal operation.

ELECTRICAL CIRCUIT

Figure 6:
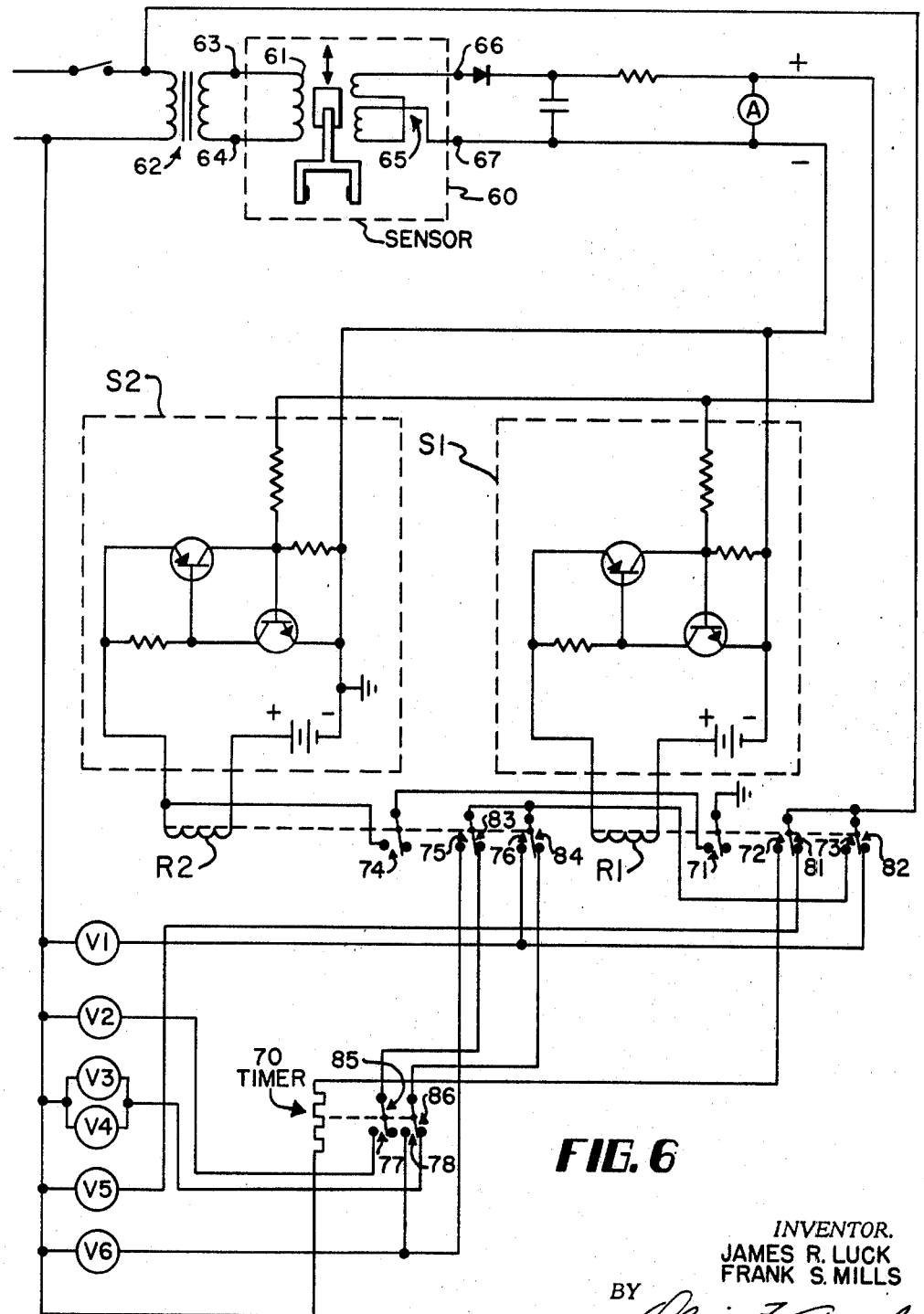
FIGURE 6 is a schematic diagram of the preferred electrical circuitry for use in combination with the control device.

Reference is now made to the electrical circuit of FIGURE 6 which cooperates with the control device to provide an improved control system according to this invention.

The electrical portion of the device including the coil means is shown as 60 in FIGURE 6. Coil 61 of the device is typically operated with curernt from a source of AC line voltage through a transformer 62 and is adapted to be connected thereto by terminals 63 and 64. The other coil generally indicated at 65, is connected to the control circuit at terminals 66 and 67. It is preferred that a differential transformer arrangement be used, in which case, one half of the primary coil 61 and one of the two secondary coils 65 is placed in each of the coil positions shown at 55 and 56 of FIGURE 4.

The control circuit connected between terminals 66 and 67 comprises: voltage sensitive switches S1 and S2, relays R1 and R2 operated by switches S1 and S2 respectively; normally open switches 71, 72, 73, operated by R1; normally open switches 74, 75, 76, operated by R2; and normally open switches 77 and 78 operated by timer 70 which is a delay relay of the type wherein a heater element is utilized to provide a delayed relay output action. Also included in the circuit are normally closed switches 81 and 82 operated by R1; normally closed switches 83 and 84 operated by R2 and normally closed switches 85 and 86 operated by timer 70. Relays R1 and R2 are of the triple-pole-double-throw type and the delay relay utilized in timer 70 is of the double-pole-double-throw type.

The six electrically operated valves of FIGURE 1 are shown schematically in FIGURE 6 to illustrate the manner in which they are connected to the control circuit. V1 is operated by switch 82; V2 by switch 83 via switch 77; V3 and V4 by switch 84 via switch 86; V5 by switch 81 and V6 by switch 75 and also by switch 84 via switch 78. The heater of timer 70 is operated by switch 72.

Voltage sensitive switches S1 and S2 are of the type shown in the RCA Transistor Manual, Technical Series SC-11, page 372. These switches are set to operate at two different voltages. S1 operates at the voltage provided at the end of the normal operating phase indicated as B in FIGURE 5. S2 operates at the voltage provided at the end of the regeneration phase indicated as D in FIGURE 5. Switches 71 and 74 function as a latching circuit means whereby S2 is maintained operative after being activated by the proper voltage level even though that level decreases to a value below the activation level. By this arrangement, S2 remains operative until the voltage decreases to a value below that which normally initiates the operation of S1 at which time both switches cease operating simultaneously.

Referring now to FIGURES 1, 2 and 6, the sequence of events during a complete cycle of the various operating phases of the preferred control system is as follows:

(1) Normal operating phase—all relays de-energized, valves V1 and V5 open.

(2) Exhaustion at end of operating phase—switch S1 activated, backwash begins.
(a) Relay R1 activated
(b) Valves V1 and V5 close
(c) Valves V3 and V4 open
(d) Delay relay heater is turned on (3) Backwash completed by signal from delay relay timer and regeneration phase begins.
(a) Valves V3 and V4 close
(b) Valves V2 and V6 open (4) Regeneration completed by signal from S2. Rinse phase begins.
(a) Valve V2 closes
(b) Valve V1 opens
(c) The differential of S2 is passed but R2 is held by the latching circuit means composed of switches 71 and 74.

(5) Rinse phase is completed by signal from S1 and the apparatus is placed back in service in the normal operating phase.
(a) Valve V6 closes
(b) Valve V5 opens
(c) Relay R2 is released
(d) Delay relay heater is turned off In order to provide a practical control system for a water softener apparatus, it is necessary to provide some means for preventing the apparatus from regenerating during daytime hours when usage is at its highest and the demand on the water softener apparatus to furnish soft water is almost continual. In such cases, a master timer arrangement may be used in combination with the above system to assure regeneration only during the nighttime hours. Such timers are well known within the art and their use will accordingly be obvious to one having ordinary skill in the art.

Although the sensor and control system have been shown in combination with a preferred softener apparatus, both are adaptable to other softener arrangements as will be obvious to those skilled in the art.

The embodiments of the invention in which an exclusive property or right is claimed are defined as follows:

1. A control device for a water softener apparatus comprising:
sensor means including a sensing element, the dimensions of which undergo a reversible change between a maximum, intermediate and a minimum value depending upon whether the water to which said element is exposed is soft, hard or a regenerating solution, respectively;
means connected to said sensing element and movable between three positions, each position being determined by and characteristic of one of said dimensional values of said sensing element, and
electrical means responsive to the positions of said movable means for automatically providing any one of three different electrical control outputs depending upon the actual position of said movable means and therefore the actual dimensional value of said sensing element whereby said softener is cycled through normal service, regeneration and rinse phases.

2. The control device of claim 1 wherein:
said sensing element is a length of hydrated ion exchange material having a maximum length when exposed to water of a predetermined softness value, an intermediate length when exposed to water of a predetermined hardness value, and a minimum length when dehydrated.

3. The control device of claim 2 wherein said length of material has one end immovably fixed and the other end connected to said movable means.

4. The control device of claim 1, wherein said electrical responsive means comprises transformer means including primary and secondary windings, and said movable means is a movably mounted core member positioned within said windings to modify the magnetic coupling therebetween by its movement relative thereto, said core member being connected to said sensing element so as to be positionally dependent within said windings upon said sensing element's dimensions.

5. A control device for a water conditioning apparatus comprising:
a sensing element in the form of a sheet of ion exchange material having a generally tubular configuration;
a tubular support member co-axially enclosing said sensing element, said support member being adapted to allow the circulation of water therethrough;
means fixedly securing one end of said sensing element to a first end of said support member;
a housing mounted at the other end of said support member;
a transformer including primary and secondary windings carried in said housing;
a movably mounted core member positioned within said windings, and
means connecting the other end of said sensing element to said core member such that said core member is positionally dependent upon said sensing element's dimensions whereby an electrical control signal is provided by said transformer which is dependent upon the dimensions of said sensing element and indicative of the ionic condition of the water to which said device is exposed.

6. The control device of claim 5 wherein:
said housing forms an axial chamber having an opening in one end communicating with said support member,
said windings are embedded in the wall of said housing in spaced relationship to each other and positioned co-axially with respect to said chamber, and
said core member is positioned within said chamber in spaced relationship with respect to said windings for axial movement within said chamber.

7. A control device for a water conditioning apparatus comprising:
sensor means including a sensing element, the dimensions of which undergo a change between a maximum, intermediate and a minimum value depending upon the ionic content of water to which said element is exposed;
means movable between three positions determined by the dimensions of said sensing element;
means responsive to the position of said movable means for providing one of three different electrical outputs depending upon the dimensions of said sensing element, said outputs providing first, second and third electrical signal values, respectively, and
associated circuit means responsively connected to said responsive means and constructed and arranged to positively control a plurality of the operating phases of a water conditioning apparatus in accordance with said outputs provided by said responsive means,
said associated circuit means including:
first signal responsive means connected to and controlled by said sensor means, said first signal responsive means being activated when said sensor signal reaches said second value and deactivated when said sensor signal falls below said second value;

second signal responsive means connected to and controlled by said sensor means, said second signal responsive means being activated when said sensor signal reaches said third value which is above said second value, and switch means operably connected to said first and second signal responsive means and adapted to initiate and control a plurality of the operating phases of the softener apparatus.

8. The control system of claim 7 wherein said associated circuit means further includes:

latching means connecting said first signal responsive means to said second signal responsive means for maintaining said second signal responsive means activated until said signal falls below said second signal value.

9. The control system of claim 7 wherein said first signal responsive means includes:

first transistor switch means, including a relay, connected to said sensor means, said relay being activated by said second signal value and deactivated when said signal falls below said second value whereby said relay is energized and de-energized in response to the activation of said first transistor switch means, said second signal responsive means includes:

second transistor switch means, including a relay, connected to said sensor means, said relay being activated by aid third signal value whereby said relay is energized in response to the activation of said transistor switch means, and said switch means includes:

first, second and third normally open switches controlled by said first relay, said second and third switches being adapted to be connected to a source of electricity, first and second normally closed switches controlled by said first relay, said switches being adapted to be connected to a source of electricity, fourth, fifth and sixth normally open switches controlled by said second relay, said fifth and sixth normally open switches being responsively connected to said third normally open switch, third and fourth normally closed switches controlled by said second relay, said third and fourth normally closed switches being responsively connected to said third normally open switch, connecting means, connecting said first and fourth normally open switches and said second relay, said connecting means forming a latching mechanism for maintaining said second relay energized after said first normally open switch has been closed by said first relay and said second transistor switch means has been activated whereby said fifth and sixth normally open switches are kept closed and said third and fourth normally open switch is opened by the de-energization of said first relay, delay relay means including a heater means for energizing said delay relay means after a predetermined period, said heater means being responsively connected to said second normally open switch, seventh and eighth normally open switches controlled by said delay relay means, said switches being responsively connected to said fifth and sixth normally open switches respectively, and fifth and sixth normally closed switches controlled by said relay, said switches being responsively connected to said third and fourth normally closed switches respectively.

References Cited

UNITED STATES PATENTS

| | | | |
|---|---|---|---|
| 1,654,537 | 1/1928 | Dotterweich | 210—96 |
| 2,904,751 | 9/1959 | Parsons | 324—61 |
| 3,176,844 | 4/1965 | Nelson | 210—96 |
| 3,178,901 | 4/1965 | Blackett | 210—96 X |
| 3,220,552 | 11/1965 | Staats | 210—96 |
| 3,246,759 | 4/1966 | Matalon | 210—96 |
| 3,250,392 | 5/1966 | Luck | 210—96 |
| 3,282,426 | 11/1966 | Entringer | 210—96 |

REUBEN FRIEDMAN, Primary Examiner

JOHN ADEE, Assistant Examiner

U.S. Cl. X.R.

210—141